(12) United States Patent
Edmiston

(10) Patent No.: US 9,647,880 B2
(45) Date of Patent: May 9, 2017

(54) REAL-TIME DISTRIBUTED NETWORK SLAVE DEVICE, REAL-TIME DISTRIBUTED NETWORK AND METHOD THEREFOR

(75) Inventor: Graham Edmiston, Bridge of Weir (GB)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/349,679

(22) PCT Filed: Nov. 4, 2011

(86) PCT No.: PCT/IB2011/054926
§ 371 (c)(1),
(2), (4) Date: Apr. 4, 2014

(87) PCT Pub. No.: WO2013/064867
PCT Pub. Date: May 10, 2013

(65) Prior Publication Data
US 2014/0226459 A1 Aug. 14, 2014

(51) Int. Cl.
*H04L 12/24* (2006.01)
*H04J 3/06* (2006.01)
(Continued)

(52) U.S. Cl.
CPC ........ *H04L 41/0672* (2013.01); *H04J 3/0641* (2013.01); *H04L 12/4035* (2013.01);
(Continued)

(58) Field of Classification Search
CPC ........... H04W 56/001; H04W 56/0015; H04W 56/002; H04W 56/0025
See application file for complete search history.

(56) References Cited

U.S. PATENT DOCUMENTS 6,144,675 A  11/2000  Wakabayashi et al.
6,567,422 B1  5/2003  Takeguchi et al.
(Continued)

FOREIGN PATENT DOCUMENTS

EP  2362585 A1  8/2011

OTHER PUBLICATIONS

Prytz Gunnar, et al: "Redundant and Synchronized EtherCAT Network", IEEE SIES 2010, pp. 201-204.
(Continued)

*Primary Examiner* — Alvin Zhu

(57) ABSTRACT

A real-time distributed network slave module is described. The real-time distributed network slave module comprises a first communications component arranged to transmit and receive real-time distributed network data over at least a first real-time distributed network connection, at least one further communications component arranged to transmit and receive real-time distributed network data over at least one further real-time distributed network connection, and at least one processing component. The at least one real-time distributed network slave module is selectively configurable to operate in a first processing mode in which the at least one processing component is configured to process real-time distributed network data travelling in a first direction between the first and at least one further communications components, and at least one further processing mode in which the at least one processing component is configured to process real-time distributed network data travelling in at least one further direction between the first and at least one further communications components.

20 Claims, 6 Drawing Sheets

(51) Int. Cl.
H04L 12/40 (2006.01)
H04L 12/403 (2006.01)
H04L 12/437 (2006.01)

(52) U.S. Cl.
CPC ...... *H04L 12/40189* (2013.01); *H04L 12/437* (2013.01); *H04L 41/0816* (2013.01)

(56) References Cited

U.S. PATENT DOCUMENTS

| | | |
|---|---|---|
| 7,649,912 B2 | 1/2010 | Balasubramanian et al. |
| 2010/0088442 A1 | 4/2010 | Kuschke |
| 2010/0166022 A1* | 7/2010 | Cho ................. G05B 19/41815 370/503 |
| 2010/0168877 A1 | 7/2010 | Begey et al. |
| 2010/0241773 A1 | 9/2010 | Rostan et al. |
| 2011/0029687 A1 | 2/2011 | Kirrmann et al. |
| 2011/0205886 A1* | 8/2011 | Maruyama ........ H04L 12/40176 370/225 |
| 2012/0057479 A1* | 3/2012 | Maruyama ......... G05B 19/4185 370/252 |
| 2012/0102240 A1* | 4/2012 | Wei ...................... H04L 12/403 710/30 |

OTHER PUBLICATIONS

International Search Report and Written Opinion correlating to PCT/IB2011/054926 dated Aug. 30, 2012.

\* cited by examiner

US 9,647,880 B2

REAL-TIME DISTRIBUTED NETWORK SLAVE DEVICE, REAL-TIME DISTRIBUTED NETWORK AND METHOD THEREFOR

FIELD OF THE INVENTION

The field of this invention relates to a real-time distributed network slave device, a real-time distributed network and a method therefor.

BACKGROUND OF THE INVENTION

In the field of automated systems, for example automated industrial systems such as manufacturing assembly lines or automotive control systems, a real-time distributed control system is often required in order for the systems to function effectively. In order to enable such real-time distributed control, a fieldbus is typically implemented to provide a real-time distributed communication mechanism between the various components that require the real-time distributed control. Fieldbus is the name of a family of industrial computer network protocols used for real-time distributed control, now standardized as IEC 61158. EtherCAT (Ethernet for Control Automation Technology) is an example of such a fieldbus network, and in particular comprises an Ethernet-based fieldbus network.

An important aspect of such fieldbus networks is their ability to provide real-time distributed control. In order to enable such real-time control, fieldbus networks such as EtherCAT networks rely on the synchronisation of the individual nodes within the system using a distributed clock mechanism, which enables the various slave nodes within the network to be synchronised within a common fieldbus time domain, and thus enables the fieldbus devices and their local applications to be synchronised to each other.

EtherCAT uses hardware within the slave nodes to synchronize the slaves to the master's time domain. Additionally an EtherCAT 'slave' controller provides an interface between the EtherCAT fieldbus and a slave application. The master device is responsible for distributing frames with specific commands that slaves use to synchronize their clocks. The master device is not required to implement an EtherCAT specific hardware, and often such master devices comprise standard Ethernet controllers. As such, the master device is often located outside of the synchronised time domain of the EtherCAT system and may require specific algorithms to synchronize its time domain to the EtherCAT network.

The distributed clock system typically implemented within an EtherCAT system can synchronise all EtherCAT nodes to one reference clock. Typically, the first slave node with distributed clock capability after the master device, within a particular Ethernet network segment, is used to provide a reference time (system time) to which all other nodes within the system are synchronised. This system time is used as the reference clock in order to synchronise the local clocks of the other EtherCAT devices, and that of the master device. Propagation delays, local clock source drift and local clock offsets are taken into account for such clock synchronisation.

The clock synchronisation process typically consists of three stages:
1. Propagation delay measurement, where the master device initiates propagation delay measurement between all slave nodes in all directions by transmitting an ARMW (Auto increment physical Read Multiple Write) broadcast message. Each EtherCAT slave controller measures and saves locally the receive time of the measurement frame in each direction. The master device collects the receive times once the ARMW frame has traveled around the EtherCAT network and returned, and calculates the propagation delays between the slave nodes;
2. Offset compensation to reference clock (system time), where the local time of each slave clock is compared to the system time, and the difference compensated individually by writing to each slave. All devices are compensated to have the same absolute system time.
3. Drift compensation to Reference Clock, where the drift between the reference clock and local clock within each slave node is required to be compensated for by periodically measuring the differences between the two and readjusting the compensation therefor.

Another requirement of many automated systems is availability/reliability of the system. Redundancy is one technique for increasing the reliability of a system, and in particular for increasing the availability of the system following a link failure. A proposed technique for providing redundancy within EtherCAT systems is a ring redundancy approach, such as illustrated in FIG. 1. In this known technique for providing redundancy within an EtherCAT system, an EtherCAT master device 110 is implemented with a master node 112 and two integrated EtherCAT slave nodes 114, 116. The EtherCAT network is arranged into a ring topology, with the EtherCAT master device 110 sending duplicate data packets in each direction around the ring (via each of the integrated slave nodes 114, 116). When a break occurs in the network, such as illustrated at 120, two independent EtherCAT line networks 140, 145 are created with each line network 140, 145 receiving a version of the (duplicated) data packets.

EtherCAT slave controllers are arranged to close an open port automatically if no device is detected on that port, and to forward frames on the next available port. Accordingly, upon a link failure 120 within the ring topology, the slave nodes 130, 135 either side of the break 120 close their respective ports and enable this 'loopback' functionality wherein frames will be looped back in the direction from which they came, creating two 'out and back' EtherCAT line networks 140, 145. Advantageously, because the EtherCAT master 110 sends duplicate data packets via each of the integrated slave nodes 114, 116, slave nodes within both of the line networks 140, 145 will continue to receive the data frames.

To minimise latency and jitter, EtherCAT slave nodes are arranged to process traffic only in one direction; all other directions of data flow within each slave node being limited to forwarding of the data. Thus, for a ring topology such as illustrated in FIG. 1, the slave nodes are typically orientated such that they process data travelling in the same direction. Accordingly, following a link failure 120, the direction of processing for the external slave nodes in one of the resulting line networks 140 will be towards the master device 110, whilst the direction of processing for the external slave nodes in the other resulting line network 145 will be away from the master device 110. In order to maintain synchronisation between the line networks, each of the integrated slave nodes 114, 116 is required to provide the distributed clock, and thus required to be the 'first' slave node within the respective line network 140, 145. Accordingly, for this known solution, the processing directions for the integrated slave nodes 114, 116 are structurally opposite to one another within the network ring in order to enable both of the integrated slave nodes 114, 116 to be 'first' in the respective line networks 140, 145 following a line break.

However, a transition from a ring topology to a dual-line topology has a significant impact on the synchronisation of the various nodes within the EtherCAT network. Whilst integrating the two slave nodes 114, 116 within the master device 110 enables a degree of synchronisation to be maintained between the two resulting EtherCAT line networks 140, 145, the master device 110 is required to recalculate the propagation delays between the slave nodes within the new network topology. As it is not possible to know in advance where a link failure might occur, it is necessary to either re-calculate from scratch the new propagation delays after the link failure 120 occurs, which is time consuming and thus delays recovery from the link failure. Alternatively, it is necessary to calculate in advance propagation delay data for all possible scenarios, which not only adds complexity and delay to the initial propagation delay measurement process, but also requires memory space to store the propagation delay data. Since an EtherCAT network may comprise, in some examples, hundreds of slave nodes, it is clearly impractical to calculate and store propagation delay data for all possible scenarios.

Another limitation of this approach to providing redundancy within an EtherCAT network is that it is only capable of supporting a ring topology, and thus only allows the deployment of slave nodes comprising two ports. Accordingly, it does not enable redundancy to be provided within more complex network topologies, such as tree topologies or the like. Furthermore, this approach requires embedding two EtherCAT slave nodes within the master device. However, this is not always possible or practical.

SUMMARY OF THE INVENTION

The present invention provides a real-time distributed network slave device, a real-time distributed network, a method for configuring a real-time distributed network slave node within a real-time distributed network and a non-transitory computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to a fieldbus slave module arranged to provide an interface between a slave application and an EtherCAT network. However, it is contemplated that the present invention is not limited solely to being implemented within EtherCAT systems, and may equally be implemented within alternative real-time distributed networks in which redundancy and synchronisation between network elements are required. In particular it is contemplated that the present invention may equally be implemented within alternative fieldbus networks.

Figure 1:
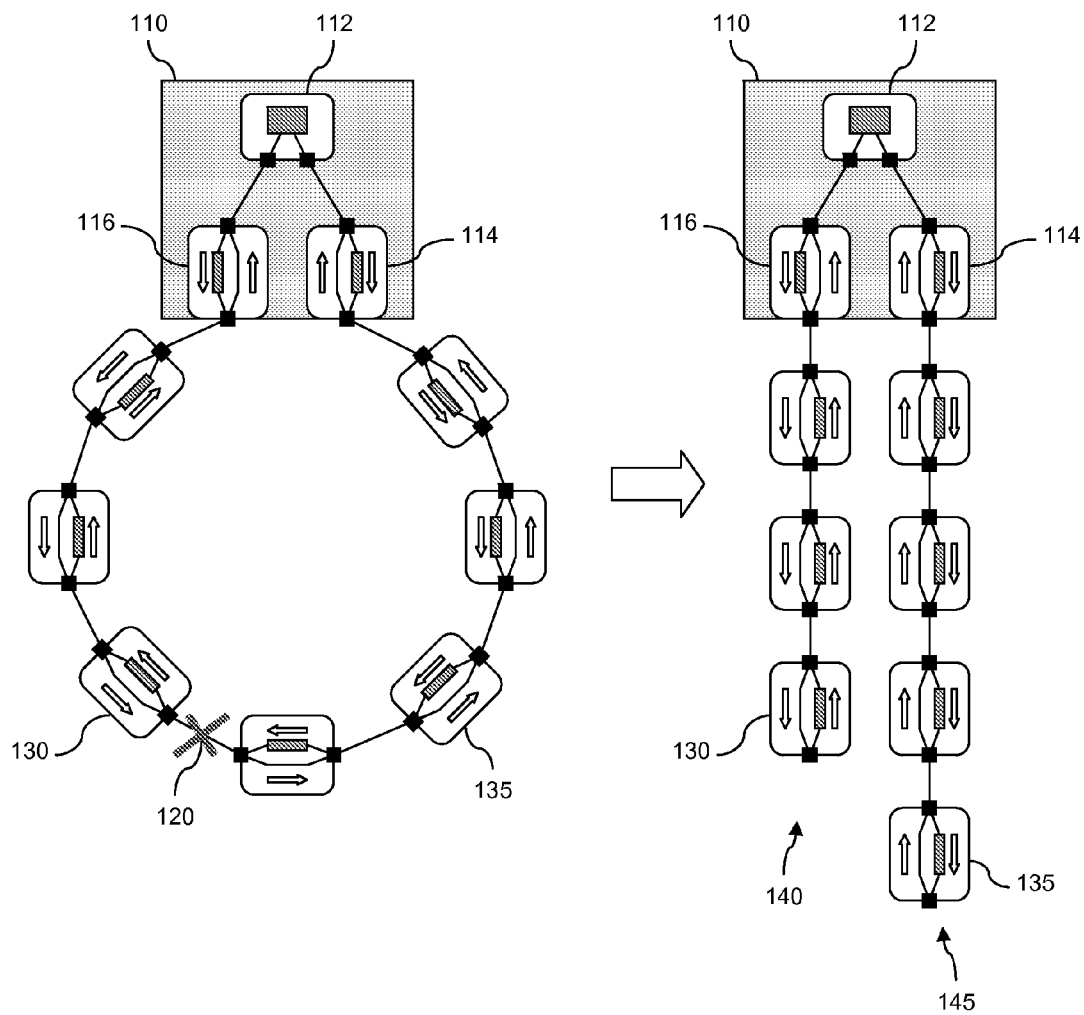
FIG. 1 illustrates a simplified block diagram of a known EtherCAT system.
Figure 2:
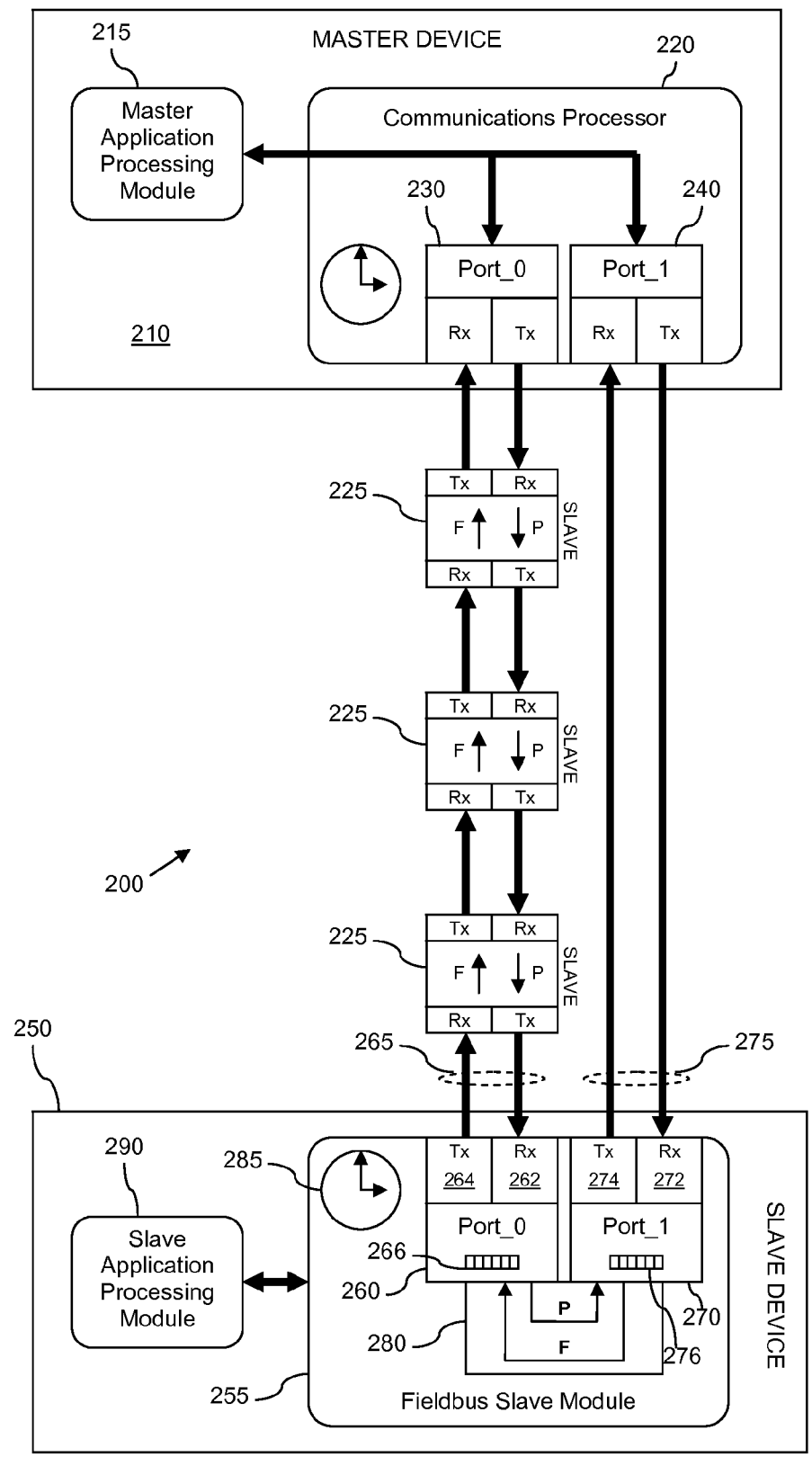
FIGS. 2 and 3 illustrate simplified block diagrams of an example of a fieldbus network.

Referring first to FIG. 2, there is illustrated a simplified block diagram of an example of a fieldbus network 200, which in the illustrated example comprises an EtherCAT system. The fieldbus network 200 comprises a master device 210. The master device 210 illustrated in FIG. 2 comprises a signal processing module 215 arranged to execute one or more master applications, including and/or software code routines. The master device 210 further comprises a communications processor 220 that is arranged to provide an interface between the one or more master applications running on the signal processing module(s) 215 and at least one fieldbus network. It will be appreciated that the master device 210 illustrated in FIG. 2 comprises just one possible example of a master device implementation. For example, the master device 210 may alternatively comprise, say, a general purpose CPU (central processing device) with internal or external communications ports or the like.

The communications processor 220 comprises a first communications component 230, denoted as Port_0 in the illustrated example, arranged to transmit and receive fieldbus data over a fieldbus connection. The communications processor 220 further comprises a second communications component 240, denoted as Port_1 in the illustrated example, arranged to transmit and receive fieldbus data over second fieldbus connection. In this manner, the first and second communications components 230, 240 of the master device 210 may be operably coupled to slave nodes 225 within the fieldbus network 200. Thus, a master application running on the processing module 215 is able to send fieldbus data frames, for example comprising commands for one or more of the slave nodes 225, over the fieldbus network via the communications components 230, 240.

As shown in FIG. 2, the first and second communications components 230, 240 are connected through the slave nodes 270 in such a manner, that data transmitted by the first communications component 230 (more specifically over transmit (TX) channel 232) to the slave nodes flows in a first direction towards the second communications component (more specifically to receive (RX) channel 244 thereof). Data transmitted by the second communications component 240 flows in a second direction, opposite to the first direction, towards the first communications component 230, as indicated with the arrows F and P in FIG. 2.

In the illustrated example, the fieldbus network 200 further comprises fieldbus slave device 250. Slave device 250 makes up one of the slave nodes within the fieldbus network 200, and comprises a fieldbus slave module 255. The fieldbus slave module 255 comprises a first communications component 260 arranged to transmit and receive fieldbus data over a first fieldbus connection, illustrated generally at 265. The fieldbus slave module 255 further comprises a second communications component 270 arranged to transmit and receive fieldbus data over second fieldbus connection, illustrated generally at 275. The fieldbus slave module 255 further comprises at least one processing component 280, and is arranged to perform forwarding of data frames received on receive channels 262, 272 of the communications components 260, 270 to transmit channels 264, 274 of the opposing communications components 260, 270 for transmission to the next node in the fieldbus network. In some examples, the fieldbus slave module 255 is arranged to perform cut-through forwarding of received data frames between the communications components 260, 270.

The fieldbus slave module 255 is selectively configurable to operate in a first processing mode in which the at least one processing component 280 is configured to process fieldbus data travelling in a first direction between the first and second communications components 260, 270, and in at least a second processing mode in which the at least one processing component 280 is configured to process fieldbus data travelling in at least a second direction opposite to the first direction between the first and second communications components 260, 270.

For example, in FIG. 2 the fieldbus network 200 is configured in a redundant network configuration in which the slave nodes 225, including the slave device 250, are configured in a ring topology between the first and second communications components 230, 240 of the master device 210. The slave nodes 225 are orientated to process data travelling in a first direction, as generally denoted by the letter 'P', from the first communications component 230 of the master device 210 to the second communications component 240 of the master device. Accordingly, in the example illustrated in FIG. 2 the fieldbus slave module 255 is configured to operate in a first processing mode in which the at least one processing component 280 is configured to process fieldbus data received at the first communications component 260 thereof and travelling in the first direction from the first communications component 260 of the fieldbus slave module 255 to the second communications component 270 of the fieldbus slave module 255. Conversely, the slave nodes 225, including the slave device 250, are arranged to forward (without processing) fieldbus data travelling in an opposite direction, as generally denoted by the letter 'F,' from the second communications component 240 of the master device 210 to the first communications component 230 of the master device 210.

In this redundant network configuration, the master device 210 may transmit data around the fieldbus network at least in the first direction from the first communications component 230. Accordingly, the slave device 250 is located at the last position in the processing order within the fieldbus network. In order to aid recovering from a link failure (as described in greater detail below) the master device 210 may be arranged to transmit duplicate data packets in each direction around the ring (via each of the communication components 230, 240), with data packets travelling in the second direction from the second communications component 240 to the first communications component 230 of the master device 210 simply being forwarded around the ring without being processed whilst the fieldbus network remains in this ring topology.

Synchronisation of the fieldbus network 200 may be achieved by implementing a distributed clock mechanism whereby a first slave node 225 in the fieldbus network (e.g. a slave node closest to the first communications component 230 of master device) comprises a reference clock used to provide a reference time (system time) to which all other nodes within the system are synchronised. For example, the first slave node is used to propagate its time to the other slave nodes in the network in order to keep all of them synchronized to the same clock. The master device 210 implements an algorithm to keep it synchronized to the first slave. Note that, in the case of the master device 210 transmitting duplicate data frames in each direction around the ring network, each data frame will travel around one half of the ring from one communications component 230, 240 back to the other communication component 240 of the master device 210. In this scenario, there is no loopback at any slave node and both of the communications components 230, 240 of the master device are 'open'. Each slave node 225, including the slave device 250, only processes the datagrams within the data frames in one direction.

EtherCAT slave controllers are arranged to close an open port automatically if no downstream device is detected, and to forward Ethernet Frames on the next available port, which for a two-port slave node will be the port via which the frame was received. Accordingly, upon a link failure within the fieldbus network 200, such as illustrated at 310 in FIG. 3, the slave nodes 320, 330 located either side of the link failure 310 close their respective ports and enable this 'loopback' functionality wherein fieldbus data frames will be looped back in the direction from which they came. Following such a link failure, the fieldbus network topology changes from a ring topology to a dual-line network comprising two-line networks illustrated generally at 340 and 350.

In this manner, data frames transmitted by the master device 210 via the first communications component 230 are processed along the first line network 340, up to the slave node 320 located adjacent the link failure, at which point they are looped back to the master device 210. For this first line network, the first slave node (illustrated at 325 in FIG. 3) in the line network 340 (e.g. a slave node closest to the first communications component 230 of master device 210) is the same as the first slave node in the original ring topology. As such, this first slave node 325 in the line network 340 may remain as the clock reference source to which other nodes within the first line network 340 may be synchronised, with the propagation delays between the slave nodes, along the processing path, within this first line network 340 remaining the same with respect to one another.

In contrast, for the second line network 350 following the link failure 310, a new clock reference is needed to be established, and synchronisation re-established for the slave nodes therein. However, because the master device 210 cannot know in advance where a link failure is going to occur, it is not possible (in a conventional fieldbus network) to determine in advance which slave node is going to be the first slave within the processing path of the 'downstream' network following a link failure (e.g. the slave node 330 located adjacent the link failure 310 in the second line network 350). Accordingly, in a conventional fieldbus network, the master device 210 is required to implement a complex algorithm that pre-measures all of the propagation delays in both directions from all conceivable link failure positions, and to find the position of the break in order to know which is the first slave (with distributed clock capability) in the downstream network path.

However, by reconfiguring the fieldbus slave module 255 of the slave device 250 to operate in the second processing mode in which the processing component 280 is configured to process fieldbus data travelling in the second direction between the first and second communications components 260, 270, the slave device 250 will become the first slave node in the processing path 'downstream' from the link failure 310, and thus will be appropriately located within the processing path of the downstream line network 350 to provide a reference clock to which the other slave nodes (which for the illustrated example comprises slave node 330) in that line network 350 may be synchronised. In this manner, by enabling such reconfiguration of the processing mode of the slave device 250, the master device 210 is able to know in advance which slave node can be used to provide the clock reference in the downstream path following a link failure, substantially irrespective of where the link failure occurs. Accordingly, in some examples, the fieldbus slave module 255 further comprises a high resolution timing source 285, whereby the fieldbus slave module 255 is capable of providing a clock reference for use within a distributed clock synchronisation mechanism.

Figure 3:
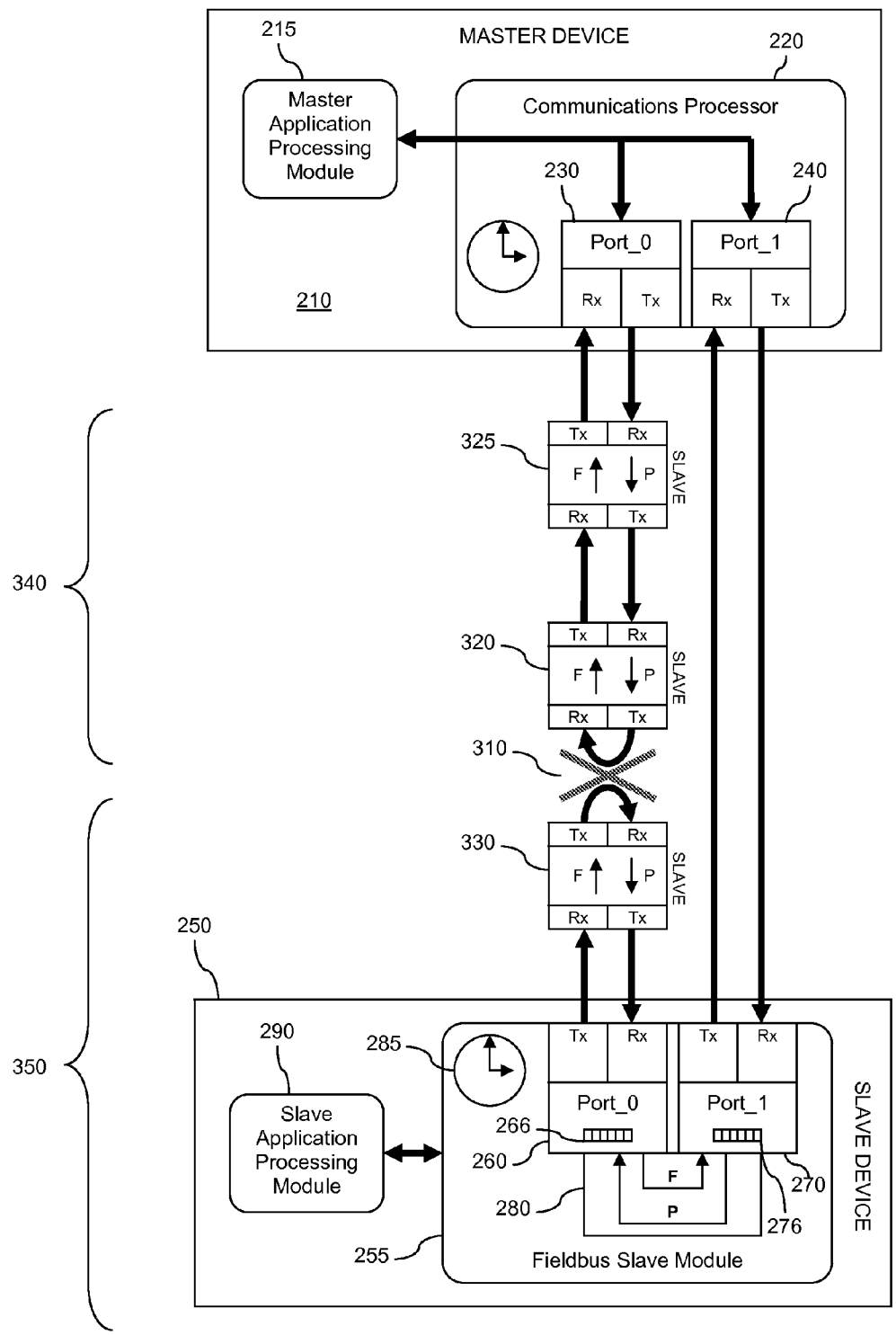

The slave device 250 may be located in substantially any position downstream from the link failure 310 for such reconfiguration of the processing mode of the slave device 250 to effectively relocate the slave device 250 within the processing path of the downstream line network 350 to provide a reference clock to which the other slave nodes (which for the illustrated example comprises slave node 330) in that line network 350 may be synchronised. However, by implementing a slave device, such as the slave device 250, in a last position within the processing path of the ring topology within a fieldbus network as illustrated in FIGS. 2 and 3, the master device 210 is able to know that the last slave node in the initial ring topology will be the first slave node encountered in the resulting downstream processing path following a link failure. By enabling such a slave device to toggle the processing direction 'on-the-fly', the master device 210 knows that it can use this slave device to keep the downstream processing path synchronized post link failure for a link failure occurring within substantially any link within the fieldbus network, with the exception of the direct link between the slave device 250 and the master device 210. The master device 210 therefore does not need a complex algorithm that pre-measures all of the propagation delays in both directions from all conceivable cable break positions. Furthermore, the master device 210 does not need to find the position of the break in order to determine the slave node that is the first slave node with distributed clock capability in the downstream processing path. Note that two synchronization algorithms are required between the master device 210 and the two slave nodes providing clock references for their respective paths. Knowing which slave node to use in advance means that the master device also does not need to hold complex tables and algorithms for recovery (noting that there could be hundreds of slave nodes in the network with a far more complex configuration than a simple initial ring topology).

Potentially, all the master device 210 needs is the propagation delays for the first slave node in each path. By toggling the processing direction 'on-the-fly' within the last slave node in the initial network, the last slave node becomes the first slave node, thereby significantly simplifying the master device algorithms that are required for control and synchronization of the network.

Furthermore, if the master device 210 uses position addressing, then a slave node will increment the address within the datagram of a received data frame, and if the value becomes zero the slave node will process the datagram's command. Thus, to address the first slave node, the master device 210 sets the position address to '−1' (0xffff), for example to send the ARMW command to propagate the first slave node's time to the other slave nodes. Following a link failure, if the command is to propagate time (ARMW on the correct address within the slave registers), the master device 210 conventionally cannot unconditionally use position addressing on the downstream path as it does not know where the break will occur and if the first slave encountered in the redundant path will have DC capability, and thus conventionally has to generate a different frame on both paths, which adds overhead and complexity. However, by implementing a slave device, such as the slave device 250, in, say, a last position within the processing path of the ring topology within a fieldbus network as illustrated in FIGS. 2 and 3 (or some other position located downstream of a subsequent link failure), the master device 210 is able to know in advance that the first slave on which processing is encountered (i.e. the slave device 250 following toggling its direction of processing) in the downstream path will have DC capability, thereby allowing position addressing to be used unconditionally, and the same frame in both paths.

The fieldbus slave module 255 may be arranged to switch from operating in a first processing mode to operating in a second processing mode (and vice versa) in any suitable manner. For example, the fieldbus slave module 255 may be arranged to switch from operating in the first processing mode to operating in the second processing mode (and vice versa) based on a bit being set within a received data frame. For example, upon receiving a data frame, the fieldbus slave module 255 may be arranged to parse datagrams within the received data frame, and to switch from operating in the first processing mode to operating in the second processing mode (and vice versa) upon a re-circulate bit (e.g. comprising a '1' value) or flag being 'set' (thereby indicating the enabling of a loopback functionality within a slave node 225 or for example in response to a link failure). Additionally and/or alternatively, the fieldbus slave module 255 may be arranged to switch from operating in the first processing mode to operating in the second processing mode (and vice versa) upon receipt of a command from the master device 210 to switch processing modes within a received fieldbus data frame. Additionally and/or alternatively, the fieldbus slave module 255 may be arranged to switch from operating in the first processing mode to operating in the second processing mode (and vice versa) upon receipt of command to switch processing modes from a local slave application running, for example executing on a processing module 290 within the slave device 250. Additionally and/or alternatively, the fieldbus slave module 255 may be arranged to selectively operate in one of the first of second processing modes for a received data frame based at least partly on local metadata. For example, and referring back to FIG. 2, if the second communications component 240 of the master device is configured in a loopback mode, a counter (not shown) may be implemented within the fieldbus slave module 255, and arranged to count data frames received by each of the communications component 260, 270 thereof. Whilst the fieldbus network remains intact, the counter for the first communications component 260 will remain greater than or equal to the counter for the second communications component 270. However, upon a link failure 310 occurring, the master device 210 will be forced to re-configure the communications component 240 thereof to transmit data frames to the section of the network downstream of the link failure. As a result, the counter for the second communications component 270 will overtake the counter for the first communications component 260, thereby indicating to the fieldbus slave module 255 a reconfiguration of the network, and thus of the need to switch processing modes.

In some examples, the fieldbus slave module 225 may comprise one or more programmable registers arranged to store one or more processing mode bits, wherein the fieldbus slave module 255 is arranged to selectively operate in a processing mode based at least partly on the processing mode bit value(s). For example, and as illustrated in FIGS. 2 and 3, the fieldbus slave module 255 may comprise a programmable register 266, 276 associated with each of the first and second communications components 260, 270. In this manner, the fieldbus slave module 255 may be arranged to process fieldbus data travelling in the first direction from the first communications component 260 to the second communications component 270 upon a processing mode bit being set within the first programmable register 266, and to process fieldbus data travelling in the second direction from the second communications component 270 to the first communications component 260 upon a processing mode bit being set within the second programmable register 276.

For the example described above and illustrated in the accompanying drawings, the fieldbus slave device has been described as being selectively configurable to operate in a first processing mode in which the at least one processing component is configured to process fieldbus data travelling in a first direction between the first and at least one further communications components, and at least one further processing mode in which the at least one processing component is configured to process fieldbus data travelling in at least one further direction between the first and at least one further communications components. In some examples, the fieldbus slave module may be further selectively configurable to operate in at least one further mode in which the at least one processing component is configured to process fieldbus data travelling in both the first direction between the first and at least one further communications components, and in the at least one further direction between the first and at least one further communications components.

The fieldbus slave module 255 in the illustrated example may enable network synchronisation, redundancy, recovery from link failure and/or overall network control to be simplified. In particular, the fieldbus slave module 255 in the illustrated example may enable a master device to know in advance the first slave node to be encountered in a downstream processing path following a link failure.

Master device algorithms for redundancy control may be simplified. For example, and conventionally, if only one slave node is used for system time then after a link failure the master device has to:
  determine where the link failure has occurred;
  read system time from the distributed reference clock slave node;
  reprogram the slaves' positions in the network topology database (or switch to fixed addressing); and
  implement a complex algorithm taking into account its processing time, jitter and transmit queuing and/or latency before sending the appropriate offset compensation values around the downstream, annexed part of the network.

However, by enabling the master device to know in advance the first slave in the annexed part of the network, and that this first slave is capable of providing distributed clock functionality, the master device is only required to:
  work out where the link failure occurred;
  reprogram the slaves' positions in the network topology database (or switch to fixed addressing);
  send data frame on 'normal' path with, for example in the case of an EtherCAT system, ARMW address=0xffff (assuming very first slave is capable of providing distributed clock functionality); and
  send data frame on downstream, annexed path with either a view of new topology or the new position programmed, or using fixed addressing.

In addition, slave to slave write algorithms implemented within the master device, such as required for synchronisation, etc., may be simplified. For example, as the slave nodes process in only one direction, it is only possible to transfer data from one slave to another slave that is further down the processing chain. Fieldbus protocols, such as EtherCAT, contain various commands that can read from one slave node and write the read value to some or all of the slave nodes after this one. This works by reading the value from an address in the slave node's memory into the datagram within a data frame, then each subsequent slave node writes this value to the same or another address in its memory (whereby in some examples this is all done within the same frame as it is forwarded around the fieldbus network). This is one reason for the first slave node that requires synchronization being used to hold the timing (clock reference) to which the other nodes are synchronised.

To write data from one slave to another slave that is ahead in the processing chain, two frames are required. The master device sends a read command in a first frame to the slave that holds the data saves it in its memory. On a subsequent frame the master device generates a write command to the slave that requires the data, whereby if all slaves need it then a broadcast write is used. By enabling the processing direction of the slave device 250 to be toggled as described above, this slave device may be made the first slave in the processing chain. The master device can then close the port on the 'true' first slave in the network creating a loop. It will then send the command on the redundant path, with the slave device 250 now being the first slave in the processing chain as it has flipped its processing direction. This can be useful if a number of updates are required back-to-back, as it can be done in fewer frames than in the case where the slaves' data is copied to a slave that is further up the chain.

Figure 4:
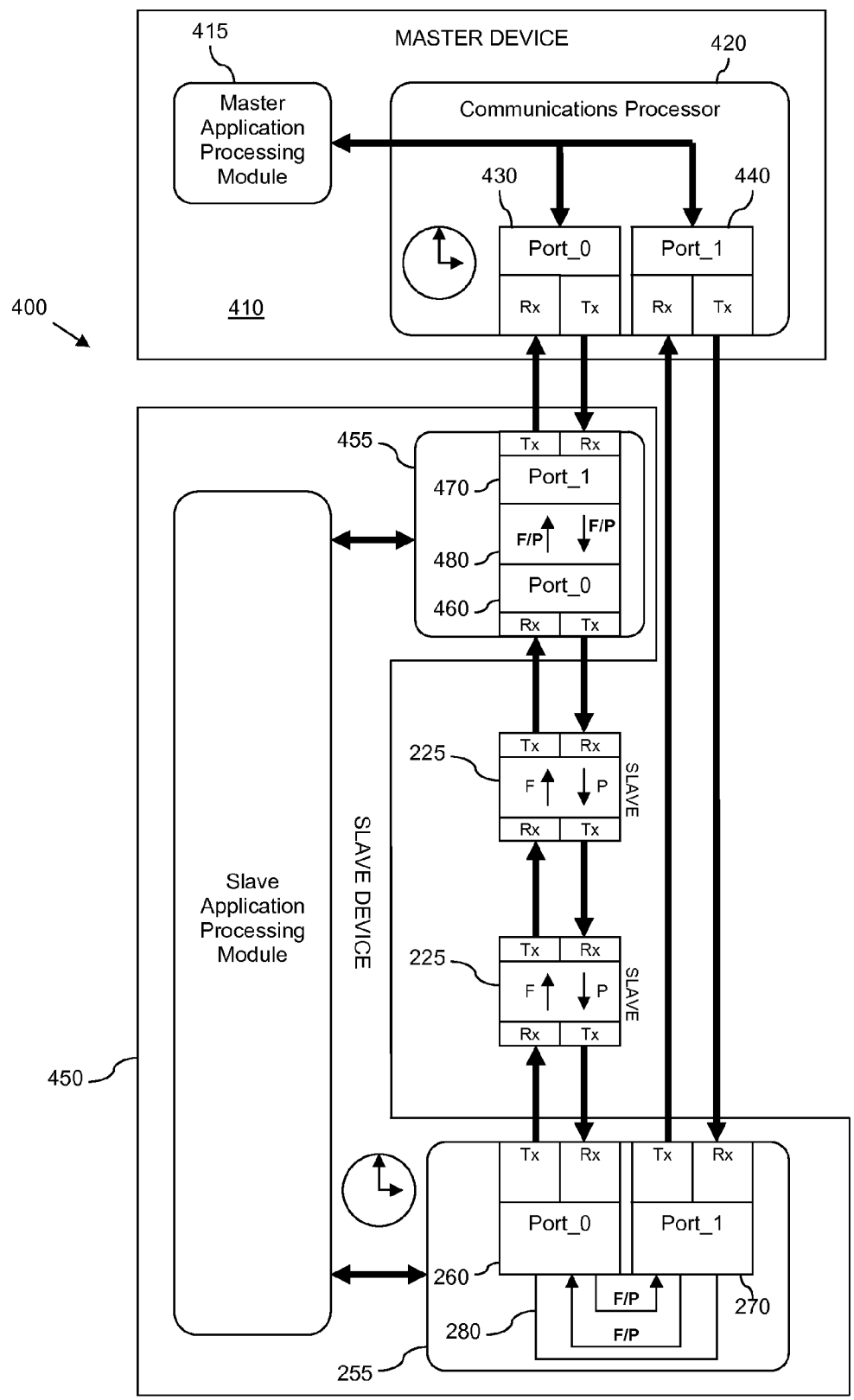
FIG. 4 illustrates a simplified block diagram of an alternative example of fieldbus network.

Referring now to FIG. 4, there is illustrated a simplified example block diagram of an alternative fieldbus network 400. The fieldbus network 400 comprises a master device 410. The master device 410 illustrated in FIG. 4 comprises a signal processing module 415 arranged to execute one or more master applications. The master device 410 further comprises a communications processor 420 arranged to provide an interface between the one or more master applications running on the signal processing module(s) 415 and at least one fieldbus network. In some examples, the master device 410 illustrated in FIG. 4 comprises just one possible example of a master device implementation. For example, the master device 410 may alternatively comprise, say, a general purpose CPU (central processing device) with internal or external communications ports or the like.

The communications processor 420 comprises a first communications component 430, denoted as Port_0 in the illustrated example, arranged to transmit and receive fieldbus data over a fieldbus connection. The communications processor 420 further comprises a second communications component 440, denoted as Port_1 in the illustrated example, arranged to transmit and receive fieldbus data over second fieldbus connection. In this manner, the first and second communications components 430, 440 of the master device 410 may be operably coupled to slave nodes within the fieldbus network 400. Thus, a master application running on the signal processing module 415 is able to send fieldbus data frames, for example comprising commands for one or more of the slave nodes 225, over the fieldbus network via the communications components 430, 440.

In the example illustrated in FIG. 4, the fieldbus network 400 further comprises fieldbus slave device 450. Slave device 450 comprises a first fieldbus slave module 255. The first fieldbus slave module 255 comprises a first communications component 260 arranged to transmit and receive fieldbus data over a first fieldbus connection. The fieldbus slave module 255 further comprises a second communications component 270 arranged to transmit and receive fieldbus data over second fieldbus connection. The first fieldbus slave module 255 further comprises at least one processing component 280, and is arranged to perform forwarding of data frames received on receive channels of the communications components 260, 270 to transmit channels of the opposing first and second communications components 260, 270 for transmission to the next node in the fieldbus network. In some examples, the fieldbus slave module 255 is arranged to perform cut-through forwarding of received data frames between the communications components 260, 270.

The first fieldbus slave module 255 is selectively configurable to operate in a first processing mode, in which the at least one processing component 280 is configured to process fieldbus data travelling in a first direction between the first and second communications components 260, 270 thereof, and in at least a second processing mode in which the at least one processing component 280 is configured to process fieldbus data travelling in at least a second direction between the first and second communications components 260, 270.

Slave device 450 further comprises a second fieldbus slave module 455. The second fieldbus slave module 455 comprises a first communications component 460 arranged to transmit and receive fieldbus data over a first fieldbus connection. The second fieldbus slave module 455 further comprises a second communications component 470 arranged to transmit and receive fieldbus data over second fieldbus connection. The second fieldbus slave module 455 further comprises at least one processing component 480, and is arranged to perform forwarding of data frames received on receive channels of the communications components 460, 470 to transmit channels of the opposing first and second communications components 460, 470 for transmission to the next node in the fieldbus network. In some examples, the fieldbus slave module 455 is arranged to perform cut-through forwarding of received data frames between the communications components 460, 470.

The second fieldbus slave module 455 is selectively configurable to operate in a first processing mode in which the at least one processing component 480 is configured to process fieldbus data travelling in a first direction between the first and second communications components 460, 470 therefor, and in at least a second processing mode in which the at least one processing component 480 is configured to process fieldbus data travelling in at least a second direction between the first and second communications components 460, 470.

In this manner, and as illustrated in FIG. 4, the first and second fieldbus slave modules 455, 255 of the slave device may be implemented within a fieldbus network; each of the fieldbus slave modules 455, 255 making up a slave node therein. In particular, the first and second fieldbus slave modules 455, 255 may be located within the fieldbus network such that they are located at the first and last positions respectively within the processing path of the fieldbus network. In this manner following a link failure within the fieldbus network, the single slave device 450 may be responsible for the first slave node (for example implemented by the first fieldbus slave module 455) in the 'upstream' network path, and for the first slave node (for example implemented by the second fieldbus slave module 255 following switching its processing direction) in the downstream network path.

In this manner, a common timing source may be used by the two fieldbus slave modules 255, 455 to synchronise their respective processing paths following a link failure. In the example illustrated in FIG. 4, the slave device 450 implements the two slave nodes by way of two separate fieldbus slave modules 255, 455, each comprising two communications components 260, 270, 460, 470, and with separate processing components 280, 480. However, in some examples, a single fieldbus slave module may comprise, for example, four communications components may alternatively be used to implement the two slave nodes. Advantageously, by enabling the use of a common timing source either side of a link failure in this manner enables simplification of the software on the master device 410 since the master device 410 needs only one synchronization algorithm to synchronise between its time domain and that of the slave nodes in the network before and after a link failure. The master device 410 may opt to use the first node in the network, 455 in FIG. 4. Regardless of where the link failure occurs, the master device 410 can access this first slave node either using communications component 430 or, in the case where the link connecting communications component 430 to fieldbus slave module 455 fails, via the communications component 440. As both the first and last slave nodes are resident on the same slave device 450, by synchronising the clock of the master device 410 to either fieldbus slave module 455 or 255, only one synchronization algorithm is needed therefor. The master device 410 need only send commands to the first slave node in the annexed network segment to propagate its time to the other nodes in the annexed part of the network requiring synchronisation.

Figure 5:
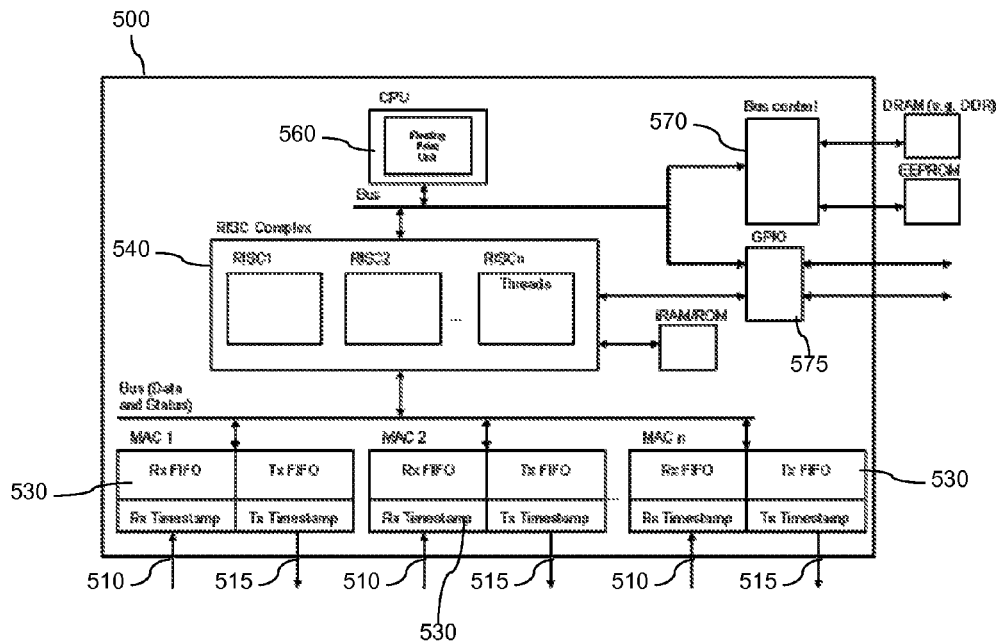
FIG. 5 illustrates a simplified block diagram of an integrated circuit device.

Referring now to FIG. 5 there is illustrated a simplified example block diagram of an integrated circuit device 500 arranged to implement a fieldbus module, such as the fieldbus slave module 255, 455 of FIGS. 2 to 4. The integrated circuit device 500 is arranged to receive packets of data, or 'frames', via one or more input channels, as illustrated generally at 510, and to route/forward received data frames over one or more output channels, as illustrated generally at 515. The integrated circuit device 500 further comprises a plurality of communications components 530 arranged to transmit and receive data frames via the input and output channels 510, 515. The communications components 530 may be implemented by way of Media Access Controllers (MACs), for example Ethernet or EtherCAT MACs containing time-stamping hardware to assist in the synchronisation and/or distributed clock mechanism. The integrated circuit device 500 in the illustrated example further comprises a RISC (Reduced Instruction Set Computing) complex 540 one or more RISC processors configurable to perform processing etc. of data frames received via the communications components 530. The integrated circuit device 500 further comprises one or more processing units 560 for running application software and managing the data plane hardware; e.g. to start and stop channels or change the routing of data frames etc. Thus, for the example illustrated in FIGS. 2 to 4, local slave applications may be implemented as computer program code running on such a processing unit 560.

In the example illustrated in FIG. 5, the integrated circuit device further comprises a bus control 570 and general purpose input/output lines 575 which may be used to enable communication between the integrated circuit device and one or more external devices, such as memory devices etc.

Figure 6:
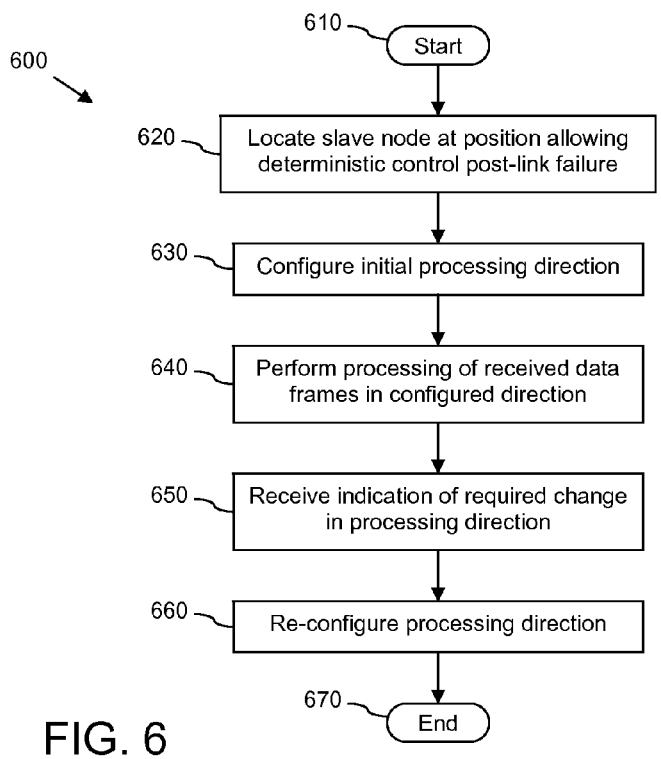
FIGS. 6 to 8 illustrate simplified flowcharts of parts of an example of a method of configuring at least part of a fieldbus network.
Figure 7:
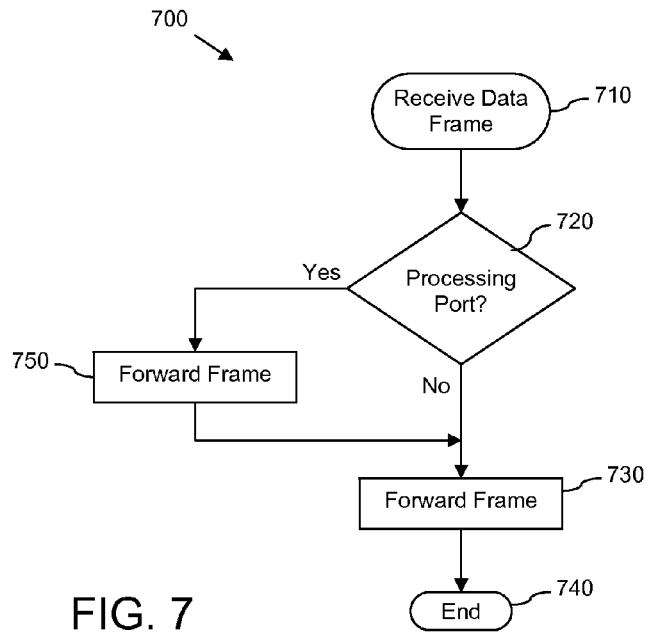
Figure 8:
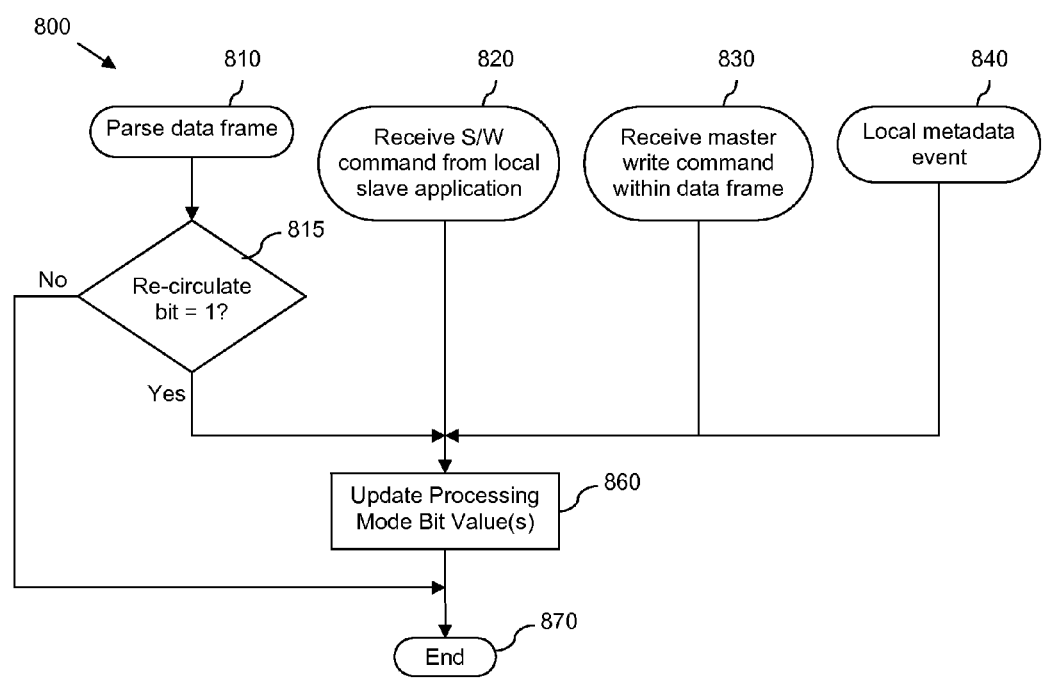

Referring now to FIGS. 6 to 8, there are illustrated simplified exemplary flowcharts of parts of a method of configuring a fieldbus slave node within a fieldbus network, for example as may be implemented within the slave devices 250, 450 of FIGS. 2 to 4. The part of the method of FIG. 6 starts at 610, and moves on to 620 where, in the illustrated example, the fieldbus slave node is located at a position that allows deterministic control of the annexed network segment in a redundant path post link failure. In some examples, such a position may comprise a 'last' position within the processing order of the fieldbus network. Next, at 630, an initial processing direction for the fieldbus slave node is configured. Processing of received data frames is then performed for data frames travelling in the initial processing direction, at 640. Upon receipt of an indication of a required change in processing direction at 650, for example such an indication being in response to, say, detection of a link failure in the network and comprising a re-circulate bit being set in a received data frame, or a command being received from a master device or a local slave application, etc., the method moves on to 660 where the processing direction of the slave node is reconfigured, for example in the opposite direction. The method then ends at 670.

The part of the method of FIG. 7 starts at 710 with a receipt of a fieldbus data frame at a communications component (e.g. port) of the fieldbus slave node. Next, at 720, it is determined whether or not the receive channel of the communications component at which the fieldbus slave mode is configured for processing (e.g. based on a bit value within a programmable register therefor). If it is determined that the receive channel of the communications component is not configured for processing, the data frame is simply forwarded to a transmit port of the next communications component of the fieldbus slave node at 730, and the method ends at 740. However, if it is determined that the receive channel of the communications component is configured for processing the method moves on to 750 where the data frame is processed, before being forwarded to a transmit port of the next communications component of the fieldbus slave node at 730, and the method ends at 740.

The part of the method of FIG. 8 starts may start at one of several events. A first such event comprises parsing a datagram from a received data frame, at 810, from where the method moves on to 815 where it is determined whether a re-circulate bit within the datagram has been set (e.g. comprises a '1' value). If the re-circulate bit has not been set, the method simply moves on to 860 and ends. However, if the re-circulate bit has been set, indicating the loopback functionality within previous slave node has been enabled and thus indicating a possible link failure, the method moves on to 850 where a processing mode bit value, for example within a programmable register, is updated to switch a processing direction of the fieldbus slave node. The method then ends at 860.

A second event comprises receiving a software command from a local slave application, at 820. Upon receipt of such a software command from a local slave application, the method moves on to 850 where a processing mode bit value is updated to switch a processing direction of the fieldbus slave node. The method then ends at 860.

A third event comprises receiving a master write command from a master device of the fieldbus network within a received data frame. Upon receipt of such a master write command, the method moves on to 850 where a processing mode bit value is updated to switch a processing direction of the fieldbus slave node. The method then ends at 860. A fourth event comprises the occurrence of a local metadata event, such as, for example, a received frame count for a first communications component comprising a value less than a received frame count for a second communications component. Upon such a metadata event occurring, the method moves on to 850 where a processing mode bit value is updated to switch a processing direction of the fieldbus slave node. The method then ends at 860.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

As used herein, the expression non-transitory will be understood to refer to the non-ephemeral nature of the storage medium itself rather than to a notion of how long the stored information itself may persist in a stored state. Accordingly, memories that might otherwise be viewed, for example, as being volatile (such as many electronically-erasable programmable read-only memories (EPROM's) or random-access memories (RAM's)) are nevertheless to be viewed here as being 'non-transitory' whereas a signal carrier in transit is to be considered 'transitory' notwithstanding that the signal may remain in transit for a lengthy period of time.

Because the illustrated embodiments of the present invention may for the most part, be implemented using electronic components and circuits known to those skilled in the art, details have not been explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the broader scope of the invention as set forth in the appended claims, which accordingly is not limited to the specific examples.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for simplicity and ease of understanding, the processing component and communications components of the fieldbus slave modules have been illustrated and described as separate logical components. However, it will be appreciated that these components may be implemented within a single functional component, for example by way of computer program code running on a processing unit.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processing unit 290 for executing slave applications and the fieldbus slave module 255 of the example illustrated in FIG. 2 may be implemented within a single integrated circuit device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A distributed network comprising:
  a master device;
  a first real-time distributed network slave device including:
    a first communications component configured to transmit and receive real-time distributed network data over a first real-time distributed network connection of the distributed network;
    a second communications component configured to transmit and receive the real-time distributed network data over a second real-time distributed network connection of the distributed network;

a processing component; and
a first high resolution timing source; and
a second real-time distributed network slave device including a second high resolution timing source; and
a third real-time distributed network slave device;
wherein the first real-time distributed network slave device is configured to:
operate in a first processing mode in which the processing component is configured to process first distributed network data travelling in a first direction between the first and the second communications components, and to operate in a second processing mode in which the processing component is configured to process second distributed network data travelling in a second direction between the first and the second communications components; and
provide a first clock reference based on the first high resolution timing source to the second and third real-time distributed network slave devices to enable the first, second, and third real-time distributed network slave devices to be synchronized to the first clock reference; and
wherein the second real-time distributed network slave device is configured to provide a second clock reference based on the second high resolution timing source to the third real-time distributed network slave device to enable the second and third real-time distributed network slave devices to be synchronized to the second clock reference instead of the first clock reference.

2. The distributed network of claim 1, wherein the first and second clock references are not provided by the master device.

3. The distributed network of claim 1, wherein the first real-time distributed network slave device is further configured to switch from operating in the first processing mode to the second processing mode on the fly.

4. The distributed network of claim 3, wherein the first real-time distributed network slave device is further configured to switch from operating in the first processing mode to the second processing mode based on at least one from a group comprising:
a bit being set within a received data frame;
a master device command within a received data frame;
receipt of a local slave application command; and
metadata for received data frames.

5. The distributed network of claim 3, wherein the first real-time distributed network slave device is further configured to switch from operating in the first processing mode to the second processing mode based on a link failure within the distributed network.

6. The distributed network of claim 1, wherein:
the first real-time distributed network slave device further comprises a first programmable register configured to store a first processing mode bit; and
the first real-time distributed network slave device is further configured to operate in the first processing mode based on a first processing mode bit value stored in the processing mode bit, and to operate in the second processing mode based on a second processing mode bit value stored in the processing mode bit.

7. The distributed network of claim 6, wherein
the first programmable register is associated with the first communications component;
the first real-time distributed network slave device further comprises a second programmable register configured to store a second processing mode bit, wherein the second programmable register is associated with the second communications component; and
the first real-time distributed network slave device is further configured to:
process the first distributed network data based upon the first processing mode bit being set within the first programmable register; and
process the second distributed network data based upon the second processing mode bit being set within the second programmable register.

8. The distributed network of claim 1, wherein the first real-time distributed network slave device is further configured to perform cut-through forwarding of received data frames in a first and a second direction between the first and second communications components.

9. A distributed network of claim 1, wherein the first real-time distributed network slave device is implemented in a single integrated circuit.

10. The distributed network of claim 1, wherein the first and second real-time distributed network connections are EtherCAT network connections.

11. The distributed network of claim 1, the first and second real-time distributed network connections are fieldbus network connections.

12. A method comprising:
configuring a first distributed network connection of a first real-time distributed network slave device in a first processing mode to process first distributed network data in a first direction between a first communication component of the first real-time distributed network slave device and a second communication component of the first real-time distributed network slave device;
configuring a second distributed network connection of the first real-time distributed network slave device in a second processing mode to process second distributed network data in a second direction between the first and second communication components;
providing a first clock reference based on a first high resolution timing source of the first real-time distributed network slave device to a second real-time distributed network slave device and a third real-time distributed network slave device of the distributed network via the second distributed network connection and a third distributed network connections to enable the first, second, and third real-time distributed network slave devices to be synchronized to the first clock reference; and
providing a second clock reference based on a second high resolution timing source of the second real-time distributed network slave device to the third real-time distributed network slave device to enable the second and third real-time distributed network slave devices to be synchronized to the second clock reference instead of the first clock reference.

13. The method of claim 12, further comprising:
switching the first real-time distributed network slave device from the first processing mode to the second processing mode on the fly.

14. The method of claim 13, wherein switching from the first processing mode to the second processing mode is based on at least one from a group comprising:
a bit being set within a received data frame;
a master device command within a received data frame;
receipt of a local slave application command; and
metadata for received data frames.

15. The method of claim 13, wherein switching from the first processing mode to the second processing mode is based on a link failure within the distributed network.

16. The method of claim 12, wherein the first and second real-time distributed network connections are EtherCAT network connections.

17. A non-transitory computer program product having executable program code stored therein for programming signal processing logic, the executable program code operable to perform a method, the method comprising:
configuring a first distributed network connection of a first real-time distributed network slave device in a first processing mode to process first distributed network data in a first direction between a first communication component of the first real-time distributed network slave device and a second communication component of the first real-time distributed network slave device;
configuring a second distributed network connection of the first real-time distributed network slave device in a second processing mode to process second distributed network data in a second direction between the first and second communication components;
providing a first clock reference based on a first high resolution timing source of the first real-time distributed network slave device to a second real-time distributed network slave device and a third real-time distributed network slave device of the distributed network via the second distributed network connection and a third distributed network connections to enable the first, second, and third real-time distributed network slave devices to be synchronized to the first clock reference; and
providing a second clock reference based on a second high resolution timing source of the second real-time distributed network slave device to the third real-time distributed network slave device to enable the second and third real-time distributed network slave devices to be synchronized to the second clock reference instead of the first clock reference.

18. The non-transitory computer program product of claim 17, the method further comprising:
switching the first real-time distributed network slave device from the first processing mode to the second processing mode on the fly.

19. The non-transitory computer program product of claim 18, wherein switching from the first processing mode to the second processing mode is based on at least one from a group comprising:
a bit being set within a received data frame;
a master device command within a received data frame;
receipt of a local slave application command; and
metadata for received data frames.

20. The non-transitory computer program product of claim 18, wherein switching from the first processing mode to the second processing mode is based on a link failure within the distributed network.

* * * * *